United States Patent Office 3,348,099
Patented Oct. 17, 1967

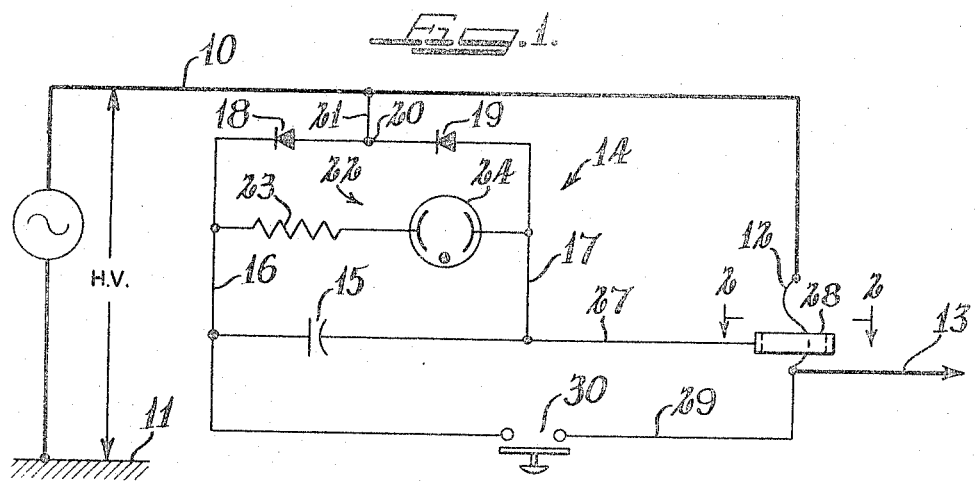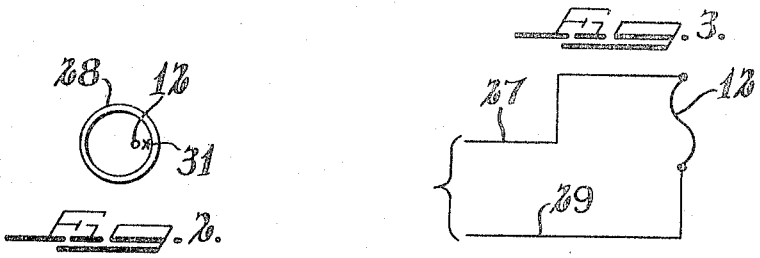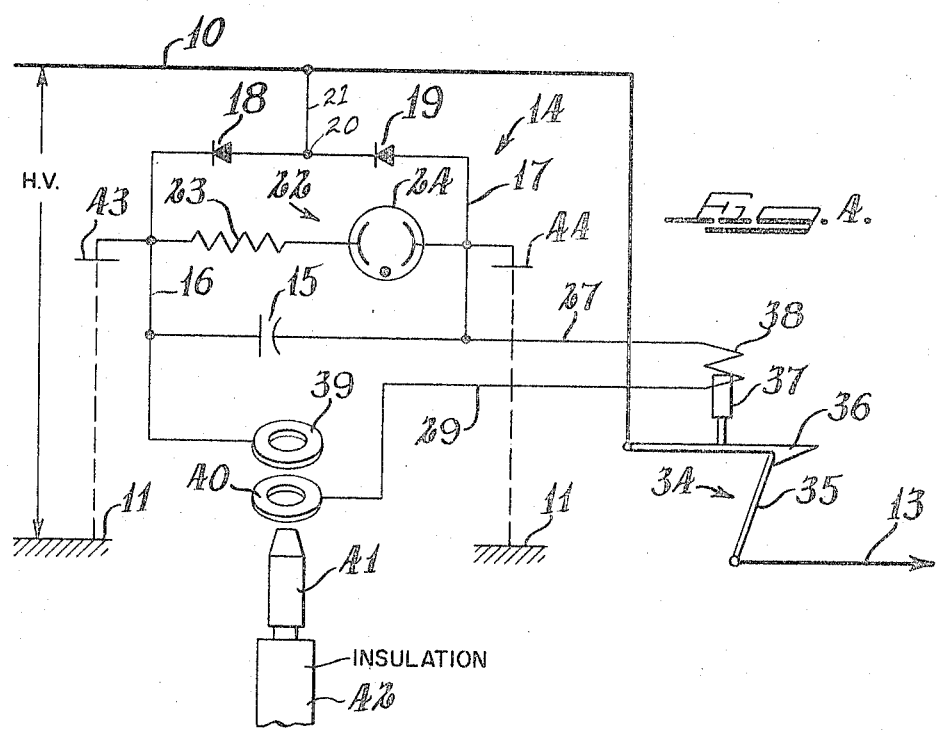

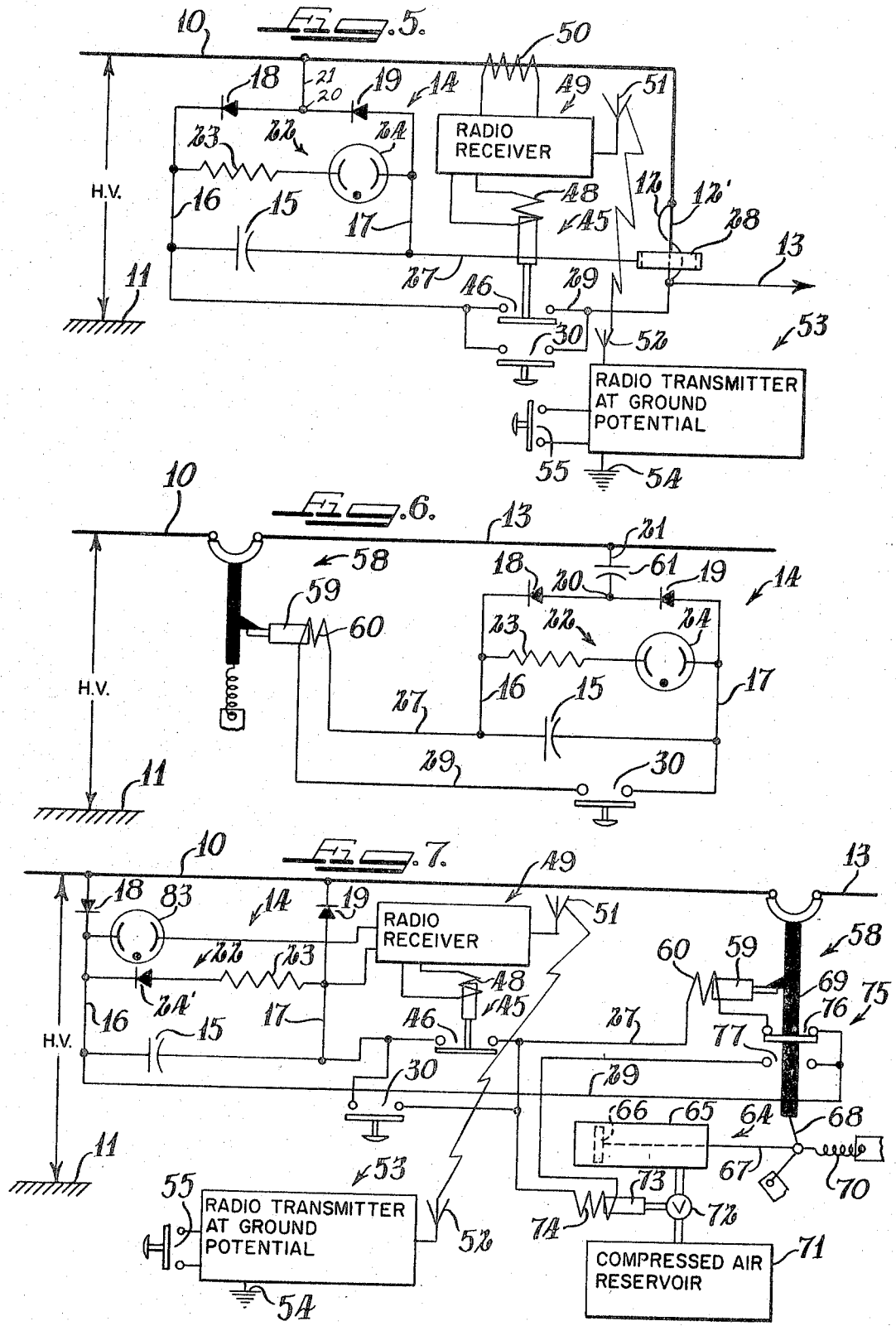

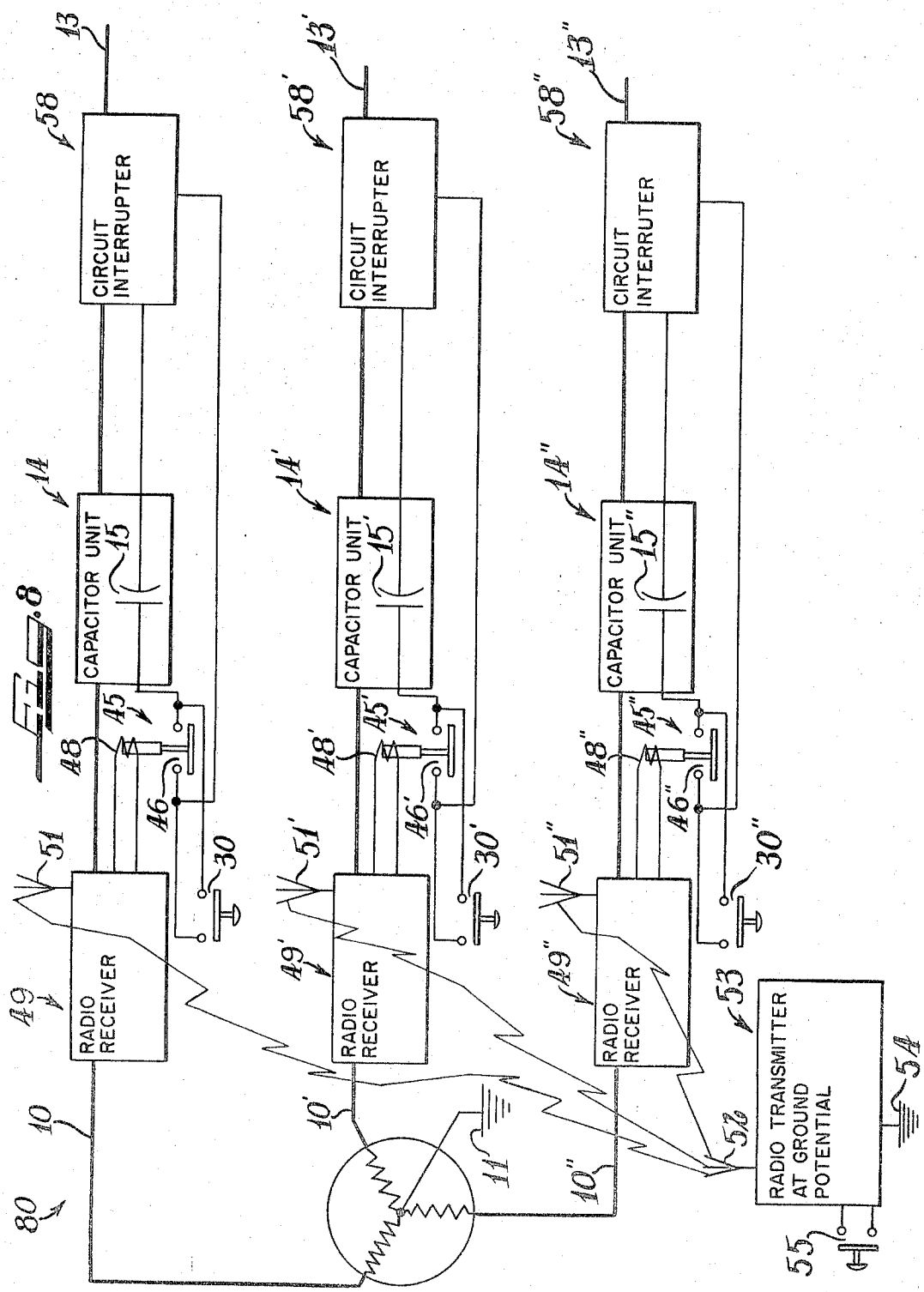

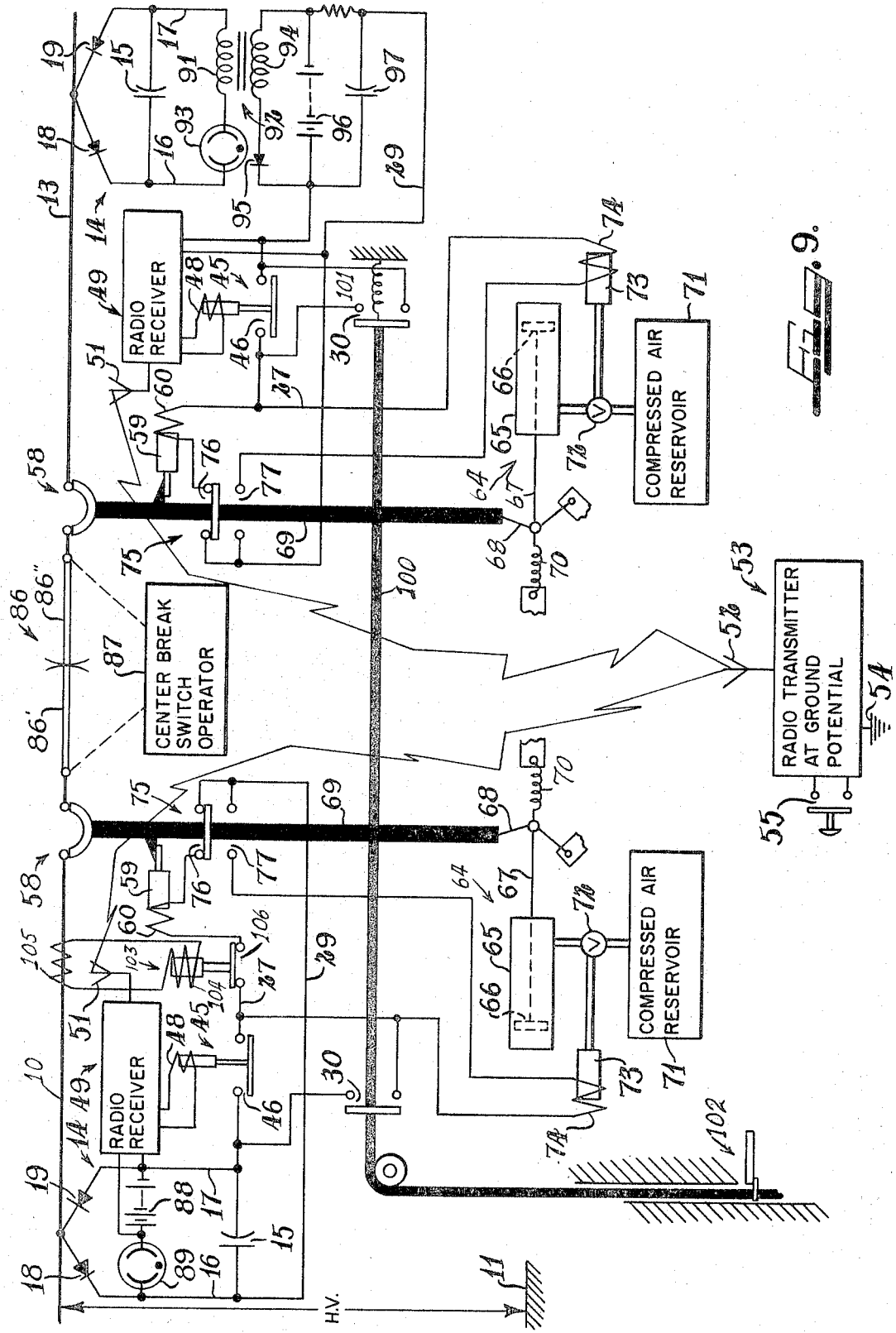

3,348,099
ELECTRIC CIRCUIT CONTROL SYSTEM EMPLOY-
ING CAPACITOR STORAGE AND DISCHARGE
Edmund O. Schweitzer, Jr., 1002 Dundee Road, North-
brook, Ill. 60062, and Robert R. Lockwood, 312 S.
Derbyshire Lane, Arlington Heights, Ill. 60604
Filed Mar. 26, 1965, Ser. No. 443,005
44 Claims. (Cl. 317—22)

ABSTRACT OF THE DISCLOSURE

For opening a circuit interrupter in series with a conductor energized at a high alternating voltage a storage capacitor is charged through a pair of series connected rectifiers having their common connection conductively connected to the conductor.

This invention relates to electrical energy storage means and the utilization of the stored energy.

Among the objects of this invention are: To provide for charging capacitor means from a high voltage alternating current conductor and utilizing the charge to perform certain control functions substantially at the voltage level of the conductor; to utilize the charge on the capacitor means for blowing a fuse, tripping a circuit interrupter, or reclosing a circuit interrupter; to complete the discharge circuit from the charged capacitor means by switch means actuated by a live line tool or remotely by a radio signal; to employ the charge on capacitor means individual to each phase of a high voltage polyphase electric power transmission circuit for simultaneously opening a circuit interrupter in each phase and for reclosing the same; to limit the voltage to which the capacitor means can be charged.

Other objects of this invention will be apparent from the following description.

In the drawings:

FIG. 1 illustrates diagrammatically the circuit connections that can be employed in practicing this invention for blowing a fusible element.

FIG. 2 is a horizontal sectional view taken generally along the line 2—2 of FIG. 1.

FIG. 3 is a diagrammatic view showing a modification of the circuit connections for FIG. 1.

FIG. 4 illustrates diagrammatically how the present invention can be employed for tripping a dropout fuse to open position.

FIG. 5 illustrates diagrammatically how the present invention can be employed for blowing a fusible element under radio control.

FIG. 6 illustrates diagrammatically how the present invention can be employed for tripping a circuit interrupter of the separable contact type.

FIG. 7 illustrates diagrammatically how the present invention can be employed using radio control for tripping a circuit interrupter of the separable contact type and for reclosing it.

FIG. 8 illustrates diagrammatically the application of the present invention to a polyphase high voltage electric power transmission system.

FIG. 9 shows another embodiment of this invention.

Referring now particularly to FIG. 1, the reference character 10 designates a line conductor that may form a part of an electric power transmission system operating at an alternating voltage ranging from 2.3 kv. to 700 kv. The conductor 10 is maintained at this voltage with respect to ground, indicated at 11, and at this voltage with respect to other conductors of the system where a polyphase system is employed, the voltage between conductors and between any conductor and ground depending upon the circuit connections.

The line conductor 10 is arranged to be connected by a current interrupter in the form of a fusible element 12 to a load conductor indicated at 13. The fusible element 12 illustrates diagrammatically a fuse link which may be employed in a dropout fuse such as that illustrated in Rawlins et al., U.S. Patent 2,403,121, issued July 2, 1946. It will be understood that other types of dropout fuses can be employed.

It is sometimes desirable to effect blowing of the fusible element 12 for the purpose of interrupting the circuit in the absence of an overload. For example, it may be desirable to employ the dropout fuse as a disconnecting switch for the purpose of deenergizing the load conductor 13.

In accordance with this invention a capacitor unit, shown generally at 14, is employed for blowing the fusible element 12. The capacitor unit 14 includes a capacitor 15 the plates of which are connected by conductors 16 and 17 to rectifiers 18 and 19 that are connected in series circuit relation to conduct direct current in the same direction. As shown the series connected rectifiers 18 and 19 are connected in shunt circuit relation with the capacitor 15. The common connection 20 between the rectifiers 18 and 19 is connected by a conductor 21 to the energized line conductor 10.

The plates of the capacitor 15 are charged on alternate half cycles of alternating voltage applied to the line conductor 10. For example, current flows during one half cycle from the conductor 10 through rectifier 18 to the plate of the capacitor 15 connected thereto. During the next half cycle, the charge remains on this plate since the rectifier 18 prevents reverse current flow. Also during the next half cycle current flows through the rectifier 19 to charge the other plate of the capacitor 15 to the opposite potential. Here, this charge is prevented from escaping during the next half cycle of the alternating current due to the presence of the rectifier 19. Unless limited, the capacitor 15 is charged to a unidirectional voltage which is equal to the sum of the maximum voltages of each half cycle of the alternating current.

In those cases where the voltage of the line conductor 10 is relatively high, it is desirable that the voltage to which the capacitor 15 is charged be limited. Accordingly, capacitor voltage limiting means, shown generally at 22, are provided. This means includes impedance means in the form of a resistor 23 connected in series circuit relation with a device 24, such as a neon lamp, zener diode, a varistor or the like. Preferably the device 24 is non-conducting until a predetermined voltage is applied thereto whereupon it becomes conducting. When this takes place, a shunt circuit is connected across the terminals of the capacitor 15 and thus the voltage to which it can be charged is correspondingly limited.

In order to blow the fusible element 12 a conductor 27 interconnects the conductor 17 wkith a metallic ring 28, FIG. 2, which is positioned in insulated spaced relation with respect to the fusible element 12. A conductor 29 completes the circuit from one terminal of the fusible element 12 through a manually operable switch 30 to the conductor 16 or the opposite side of the capacitor 15. The switch 30 is arranged to be closed by a lineman using a live line tool. On closure of the switch 30 a discharge circuit is completed from the capacitor 15 between the fusible element 12 and the metallic ring 28. This voltage is sufficient to cause an arc 31 to be formed the heat of which is sufficient to burn through the fusible element 12 at the arc root. The effect then is essentially the same as when the fusible element 12 is blown due to overcurrent flow therethrough. The dropout fuse then is unlatched and drops to the open position.

It will be observed that the capacitor unit 14 and circuit connections thereto all are positioned essentially at the voltage of the line conductor 10. Thus it is unnecessary to provide any more insulation for the various circuit elements than is necessary to effect their operation at this voltage. None of the circuit elements need be insulated from the line conductor 10 to the extent that would be required if any of them were located, for example, at the potential of the ground 11. As soon as the switch 30 is released by disengagement by the live line tool, its contacts are automatically opened and the circuit previously established from the line conductor 10 through rectifier 18 and conductors 16 and 29 to the load conductor 13 is opened. Then, as soon as the fuse drops outs, the load conductor 13 is completely deenergized.

FIG. 3 shows an alternate circuit arrangement for interconnecting the capacitor unit 14 and the fusible element 12. Here it will be observed that the conductors 27 and 28 are connected to the terminals of the fusible element 12. With these connections the current flow from the capacitor 15 is sufficient to blow the fusible element 12 in the same manner that it is blown as a result of flow therethrough of overcurrent. The operation of the dropout fuse then is the same as described above.

FIG. 4 shows the capacitor unit 14 arranged to unlatch a dropout fuse that is indicated, generally, at 34. It includes a pivoted fuse tube 35 that is normally held in the circuit closed position by a latch 36 to which an armature 37 is connected. A winding 38 is arranged to attract the armature 37 and move the latch 36 out of latching engagement with the pivoted fuse tube 35. In order to complete the energizing circuit for the winding 38 conducting rings 39 and 40 are interposed in insulated spaced relation in the conductor 29 with the openings therethrough in alignment for receiving a metallic connector plug 41 that is carried by an insulated live line tool 42. When it is desired to cause the fuse 34 to drop out, the lineman inserts the metallic connector plug 41 into the openings in the rings 39 and 40 and completes the energizing circuit for the winding 38 from the capacitor 15. The armature 37 then is attracted to lift the latch 36 and permit the fuse tube 35 to swing downwardly to the open position.

With a view to increasing the speed at which the capacitor 15 is charged, capacitor plates 43 and 44 are connected, respectively, to the conductors 16 and 17. The capacitor plates 43 and 44 are employed where it is desirable that the capacitor 15 be recharged without delay.

FIG. 5 shows how the capacitor unit 14 can be employed for blowing a fusible element 12 having in parallel therewith a conventional strain element 12'. It will be understood that the strain element 12' is employed for withstanding the tension of the retraction spring in the dropout fuse while the fusible element 12 is used for calibrating purposes and need not be sufficiently strong to withstand the tension of the spring. A metallic ring 28 is arranged to surround both the fusible element 12 and the strain element 12'. Alternatively it can be arranged to surround only the strain element 12' which is released on discharge of the capacitor 15 with the retraction spring then being sufficiently strong to separate mechanically the fusible element 12.

Provision is made for remote operation of the capacitor unit14 by a relay that is indicated, generally, at 45. The relay 45 includes normally open contacts 46 that are connected in the conductor 29 and when closed complete the discharge circuit for the capacitor 15 as previously described. If desired, the manually operable switch 30 can be connected in parallel with the normally open contacts 46 to provide for separate discharge of the capacitor 15.

The winding 48 is arranged to be energized by a radio receiver that is indicated, generally, at 49 and may be of any conventional type such as the type that is employed in conjunction with garage door operating mechanisms. A radio receiver 49 can be powered by a battery or preferably it is energized from the line conductor 10. For this purpose a secondary winding 50 can be employed to function with the line conductor 10 as a current transformer. Alternatively the radio receiver 49 can be energized from the direct voltage that is maintained across the terminals of the capacitor 15 as will be described hereinafter.

The radio receiver 49 is provided with an antenna 51 for receiving radio waves from an antenna 52 of a radio transmitter that is indicated, generally, at 53. The radio transmitter 53, which may be of the kind and character that is employed for operating a garage door radio receiver, is indicated as being located at ground potential and the ground connection is indicated at 54. Actually such an arrangement is effective as the result of the capacitance between the radio transmitter 53 and ground such as through the body of the lineman carrying the transmitter 53. For energizing the radio transmitter 53 to apply a control impulse to the radio receiver 49 a push button 55 is employed. When it is desired to blow the strain element 12' and fusible element 12, the push button 55 is operated to cause an impulse to be transmitted to the radio receiver 49. The winding 48 then is energized, contacts 46 are momentarily closed and the capacitor 15 discharges in the manner previously described to blow the strain element 12' and the fusible element 12 or the strain element 12' alone. The dropout fuse then is released and opens the circuit between the line conductor 10 and the load conductor 13.

Under the jurisdiction of the FCC certain radio frequencies are allotted for use with radio receivers and transmitters such as the receiver 49 and transmitter 53. Other frequencies can be employed as may be desired, it being understood that any frequency in radio spectrum from 10 kc./s. to 3,000,000 mc./s. can be employed.

In FIG. 6 there is shown, generally, at 58 a circuit interrupter of the separable contact type which when closed interconnects line conductor 10 and load conductor 13. For tripping the circuit interrupter 58 an armature 59 is employed in conjunction with a trip winding 60. On closure of the contacts of the switch 30 by a live line tool, the capacitor 15 is connected to discharge through the trip winding 60 to attract the armature 59 and permit opening of the circuit interrupter 58. While the capacitor unit 14 and circuit connections associated therewith are generally arranged to operate at the voltage of the load conductor 13, it will be observed that the conductor 21 is connected directly to the load conductor 13. Thus, when the circuit interrupter 58 is opened, all of the circuit connections associated with the capacitor unit 14 are completely deenergized.

If desired, a capacitor 61 can be interposed in the conductor 21 to complete the circuit therethrough instead of having a direct metallic connection.

FIG. 7 shows a further embodiment of the invention. Here it will be observed that the rectifiers 18 and 19 are connected directly to the line conductor 10 without requiring the use of the conductors 20 and 21. Electrically the circuit connections for the capacitor units 14 in FIGS. 1 and 7 are identical. In addition in FIG. 7 instead of the neon lamp 24, a zener diode 24' is shown in series with the resistor 23 to complete the voltage limiting means for the capacitor 15.

Provision is made in FIG. 7, not only for tripping the circuit interrupter 58 but also for reclosing it. For this purpose an operator, shown generally at 64, is employed. It includes an air cylinder 65 having a piston 66 therein connected by a piston rod 67 to a linkage 68 that, in turn, is connected to operating rod 69 of the circuit interrupter 58. A spring 70 acts to bias the operating rod 69 and the circuit interrupter 58 to the open position. The operating rod 69 is held in the circuit closed position by the armature 59. For energizing the air operator 64 compressed air is provided in a compressed air reservoir 71 and flow therefrom to the air cylinder 65 is controlled by a valve 72. For opening the valve 72 an armature 73 is employed under the control of a closing winding 74. The closing winding 74 is arranged to be energized on closure of the normally open contacts 46 of the relay 45 or on closure of the contacts of manually operable switch 30.

In order to shift the control of the operation of the circuit interrupter 58 to either the relay 45 or to the switch 30 an auxiliary switch, shown generally at 75 and operated by the movement of the operating rod 69, is employed. The auxiliary switch 75 includes contacts 76 that are closed when the circuit interrupter 58 is in the closed position to prepare the circuit for energizing the trip winding 60. When the circuit interrupter 58 is in the open position, contacts 77 of the auxiliary switch 75 are closed to prepare the circuit for energizing the closing winding 74.

In operation the system shown in FIG. 7 can be controlled, as indicated, either by operation of the relay 45 or by operation of the switch 30, using energy stored in the capacitor 15 for effecting the energization of the windings 60 and 74, depending upon the position of the auxiliary switch 75. Assuming that the circuit interrupter 58 is in the closed position and it is desired to open it, the lineman brings the radio transmitter 53 into the operating range of the radio receiver 49 and depresses the push button 55. The radio signal then is transmitted from antenna 52 to antenna 51 and winding 58 of the relay 45 is energized. Contacts 46 then are closed to complete an obvious energizing circuit for the trip winding 60 from the capacitor 15 through contacts 76. The armature 59 is withdrawn and the circuit interrupter 58 is moved to the open position by spring 70.

When it is desired to reclose the circuit interrupter 58, the operator again depresses the push button 55 to transmit a signal to the radio receiver 59. The contacts 46 of the relay 45 are again closed and the energizing circuit for the closing winding 74 is completed from the capacitor 15 through the contacts 77. The valve 72 is opened and compressed air flows from the reservoir 71 to the air cylinder 65. The circuit interrupter 58 then is reclosed and is latched in the closed position. The contacts 77 are opened and the contacts 76 are closed to prepare the system for the next tripping operation.

Under normal operating conditions the line conductor 10 remains energized while the load conductor 13 is deenergized as long as the circuit interrupter 58 is open. Consequently, as soon as the circuit interrupter 58 is opened in the manner above described, the capacitor 15 immediately recharged. If desired, the speed of recharging of the capacitor 15 can be increased through the provision of the plates 43 and 44 as previously described.

In the event that direct manual operation of the circuit interrupter 58 is desired, the switch 30 can be manipulated by a live line tool. If the circuit interrupter 58 is in the closed position, the energizing circuit for the trip winding 60 is completed on closure of the switch 30 from capacitor 15 through the contacts 76 of the auxiliary switch 75. On the next momentary closure of the switch 30 by the live line tool, the circuit for the closing winding 74 is completed from the capacitor 15 through the contacts 77 of the auxiliary switch 75.

It will be apparent in FIG. 7 that all of the circuits and mechanism required for operating the circuit interrupter 58 to the open or closed position can be mounted to function substantially at the voltage of the line conductor 10. It is unnecessary to provide other than minimum insulation between these circuits and the operating mechanisms and the line conductor 10 since no part of the circuits or mechanism is anywhere adjacent ground 11. At suitable intervals the line conductor 10 can be deenergized and the supply of compressed air in the reservoir 71 replaced. Alternatively, if desired, an insulating conduit can be connected to the compressed air reservoir 71 for maintaining the supply of compressed air therein from a source of compressed air at ground potential.

FIG. 8 shows, generally at 80, a three phase high voltage electric power transmission line comprising the line conductor 10 and additional line conductors 10' and 10''. The polyphase power transmission line 80 is employed for transmitting alternating current from one location to another with the phase to phase voltages being determined by the design and circuit characteristics of the system. It will be understood that the phase to phase voltages may range upwardly to several hundred thousand volts. For the respective phases there are provided circuit interrupters 58, 58' and 58'' which may be constructed and arranged as illustrated diagrammatically in FIG. 7. Also associated with the several phase conductors are capacitor units 14, 14' and 14'' which include capacitors 15, 15' and 15''. Provision is made for charging these capacitors from the respective phase conductor in accordance with any of the previously described circuit arrangements. If desired, individual control switches 30, 30' and 30'' are provided for effecting individual operation of the respective circuit interrupter by manipulation of a live line tool by a lineman on the ground. Alternatively radio receivers 49, 49' and 49'' are associated with respective phase conductors to be commonly operated by the radio transmitter 53 located at ground potential indicated at 54. On depression of the push button 55 associated with the radio transmitter 53 a radio signal is transmitted from the antenna 52 to the antennae 51, 51' and 51'' of the respective radio receivers 49, 49' and 49'' with the result that the circuit interrupters 58, 58' and 58'' are simultaneously tripped or closed depending upon the previous operation.

In the event that it is desired to code the radio signals transmitted by the transmitter 53 to the radio receivers 51, 51' and 51'', the various arrangements for such operation as shown in copending application Ser. No. 253,100, filed Jan. 22, 1963, can be employed. Through the use of such coding means provision is made to prevent response by the radio receivers 51, 51' and 51'' to any radio signal other than the signal transmitted by the transmitter 53.

The radio receivers 49, 49' and 49'' in FIGS. 7 and 8 can be battery energized. Preferably they are energized from the respective conductor 10, 10' and 10''. For this purpose the secondary winding 50, FIG. 5, can be used. Since a unidirectional voltage is maintained across capacitor 15, FIG. 7, the radio receiver can be connected across it through a device 83, such as a neon lamp, zener diode and the like, and between conductors 16 and 17. As will appear hereinafter a chargeable battery can be used not only to power the radio transmitter 49 but also to trip and close the circuit interrupter 58.

The capacitor 15 retains its charge after deenergization of the conductor 10 or 13 to which it is connected for energization. The charge gradually leaks off at a rate which depends upon the insulation between the terminals of the capacitor 15. Since the capacitor 15 retains its charge for a time after the line conductor 10, for example, is deenergized, it is possible to employ its discharge for effecting operation of the circuit interrupter 58 even though the line conductor 10 is deenergized. This is advantageous in those systems where it is desired that the circuit interrupter be opened while the line conductor 10 is deenergized.

FIG. 9 shows one phase of a polyphase high voltage electric power transmission line employing two circuit interrupters 58 connected in series circuit relation through a center break disconnecting switch, shown generally at 86, which may be constructed as shown in U.S. Patent 3,047,685, issued July 31, 1962, to P. Sciscione. Any other suitable center break disconnecting switch construction can be employed. The operator for the disconnecting switch 86 is indicated at 87. It will be understood that the operator 87 can be manually operated or remotely operated to swing the switch blades 86' and 86'' from and to the switch closed position. Preferably provision is made for swinging them to the switch open position only after the circuit has been first interrupted by the simultaneous opening of the circuit interrupters 58.

As described hereinbefore a radio receiver 49 is provided individual to each of the circuit interrupters 48 for effecting its control to the open and closed positions. Likewise switches 30 are provided to be operated by a live line tool for effecting individual operation of the respective circuit interrupter 58.

Different provisions can be made employing the capacitor units 14 for energizing the radio receivers 49 and effecting the tripping and closing of the circuit interrupters 58. It will be understood that identical circuit connections can be employed for each of the circuit interrupters 58. However, different arrangements are shown to illustrate different embodiments of the invention.

The capacitor unit 14 as shown to the left in FIG. 9 includes a chargeable battery 88 that is connected in series circuit relation with a device 89 which may be a neon lamp, a zener diode, a varistor or the like which becomes conducting only upon the application of a predetermined voltage thereto on the capacitor 15. The battery 88 is maintained charged as the result of current flow through the rectifier 18 and because of the presence of the capacitor 15. Here the radio receiver 49 is arranged to be energized from the battery 88 while the circuit connections for energizing the trip winding 60 and closing winding 74 are connected through the associated auxiliary switch 75 for energization across the capacitor 15 either on operation of the relay 45 or closure of the contacts of switch 30.

The capacitor unit 14 shown to the right of FIG. 9 includes a primary winding 91 of a transformer that is indicated, generally, at 92. The primary winding 91 is connected through a device 93, such as a neon lamp, a zener diode, etc., and across the capacitor 15. The transformer 92 includes a secondary winding 94. Preferably the ratio of transformation is relatively high from the primary winding 91 to the secondary winding 94. For example, it may be of the order of 100 to 1. Other ratios of transformation can be employed. The secondary winding 94 is connected through a rectifier 95 to charge a battery 96. Also connected across the battery 96 is a capacitor 97 which is charged to the voltage to which the battery 96 is charged. The combination of the battery 96 and capacitor 97 provides a source of energy which, insofar as the capacitor 97 is concerned, can be delivered at a relatively high rate for correspondingly energizing the trip winding 60 or the closing winding 74 for overcoming inertia and breaking loose the respective armature 59 and 73 in the event that such action should be required. The battery 96 provides for continued flow of current for energization of the load devices connected thereacross. It will be noted here that the radio receiver 49 is connected for energization across the battery 96 and that, as referred to, the trip winding 60 and closing winding 74 are likewise connected for energization across the battery 96 and to receive the discharge from the capacitor 97.

The radio transmitter 53 is employed for effecting simultaneous tripping of the circuit interrupters 58 by simultaneously connecting their trip windings 60 for energization in the manners described. On closing of the contacts of the push button switch 55, a pulse of electromagnetic energy is radiated from the antenna 52 to the antennae 51 of the two radio receivers 49. The relays 45 are operated simultaneously to close their contacts 46 and effect the energization of the respective trip winding 60. Following opening of the circuit interrupters 58, the center break switch operator 87 is employed for swinging the blades 86' and 86" of the center break disconnecting switch 86 to the open position.

It will be understood that the circuit interrupters 58 and operating mechanisms and circuits associated therewith all are arranged and constructed to operate substantially at the potential of the line conductor 10 and load conductor 13. This is of particular importance where the operating voltage of the conductors 10 and 13 is the order of 500 kv. A portion of the center break switch operator 87 is mounted to operate at ground potential, there being suitable insulators making the mechanical connections to operate the switch blades 86' and 86" in accordance with conventional practice. The radio transmitter 53 is arranged to operate substantially at ground potential as described hereinbefore.

Simultaneous operation of the circuit interrupters 58 can be effected by mechanically interconnecting the switches 30 with insulating means and providing additional insulating means extending to ground potential. The arrangement is such that the contacts of the switches 30 are closed simultaneously to complete energizing circuits for the trip windings 60 or for the closing winding 74, depending upon the positions of the auxiliary switches 75. The simultaneous operation of the switches 30 can be effected through the use of a flexible insulating tension member 100 operating against the forces of a spring 101 tending to bias the contacts of the switches 30 to closed positions. Latch means 102 at ground potential acts to restrain the flexible tension member 100 against movement by spring 101. On release of the latch means 102 the spring simultaneously closes the contacts of the switches 30 to effect simultaneous energization of trip windings 60 or closing windings 74 and thereby simultaneous tripping or closing of the circuit interrupters 58 depending upon the last operation thereof.

If it is desired to prevent tripping of the circuit interrupters 58 while current in excess of that which they are intended to interrupt is flowing in the conductors 10 and 13, relay means can be provided for opening the circuits to the trip windings 60 as long as such current flows. For example, as shown on the left side of FIG. 9, a relay 103 is employed for this purpose having a winding 104 connected for energization to a secondary winding 105 of a current transformer the primary winding of which is the conductor 10. Normally closed contacts 106 of relay 103 are connected in series with the trip winding 60 and are held open as long as the excess current flows in the conductor 10. A similar relay arrangement can be connected in the system shown at the right of FIG. 9. Thus tripping of both circuit interrupters 58 is prevented as long as the excess current flows in the conductors 10 and 13.

U.S. Patent No. 3,172,980 issued Mar. 9, 1965, to H. Thommen shows a switch and circuit interrupter arrangement that can be used in practicing this invention. This patent shows air operated switch and interrupter contacts and requires hollow insulators for transmitting the compressed air for operation of the switching structure. Instead of the hollow insulators and compressed air of this patent, the capacitor units 14, as shown in FIG. 9, can be employed together with the various control arrangements disclosed herein for utilizing the energy stored at the potential of the conductors 10 and 13 for effecting the desired switching functions.

What is claimed as new is:

1. In an electric power system, the combination with a line conductor energized at a relatively high alternating voltage connected by circuit interrupter means to a load conductor, and operating means for said circuit interrupter means to disconnect said load conductor from said line conductor; of means for initiating the functioning of said operating means including: capacitor means, rectifier means, conductive circuit means directly interconnecting said capacitor means and one of said conductors through said rectifier means to charge one side of said capacitor to one polarity during those half cycles of the alternating voltage of said one polarity and to charge the other side of said capacitor to the opposite polarity during those half cycles of the alternating voltage of said opposite polarity whereby said capacitor means is charged to a unidirectional voltage, and circuit means for interconnecting said capacitor means and said operating means.

2. In an electric power system, the combination with a line conductor energized at a relative high alternating voltage connected by circuit interrupter means to a load conductor, and operating means for said circuit interrupter means to disconnect said load conductor from said line conductor; of means for initiating the functioning of said operating means including: capacitor means, a pair of rectifiers commonly connected in series circuit relation to conduct direct current in the same direction and in shunt circuit relation to said capacitor means, conductive circuit means directly interconnecting the common connection between said rectifiers and one of said conductors to charge one side of said capacitor to one polarity during those half cycles of the alternating voltage of said one polarity and to charge the other side of said capacitor to the opposite polarity during those half cycles of the alternating voltage of said opposite polarity whereby said capacitor means is charged to a unidirectional voltage, and circuit means for interconnecting said capacitor means and said operating means.

3. In an electric power system, the combination with a conductor energized at a relatively high alternating voltage, circuit interrupter means connected in series with said conductor, and trip means therefor; of means for initiating the operation of said trip means including: capacitor means, rectifier means, conductive circuit means directly interconnecting said capacitor means and said conductor through said rectifier means to charge one side of said capacitor to one polarity during those half cycles of the alternating voltage of said one polarity and to charge the other side of said capacitor to the opposite polarity during those half cycles of the alternating voltage of said opposite polarity whereby said capacitor means is charged to a unidirectional voltage, and circuit means for interconnecting said capacitor means and said trip means.

4. In an electric power system, the combination with a conductor energized at a relatively high alternating voltage and a dropout fuse device connected in series with said conductor, said dropout fuse device having fusible means adapted on blowing to effect the dropout action thereof; of means for blowing said fusible means including: capacitor means, rectifier means, conductive circuit means directly interconnecting said capacitor means and said conductor through said rectifier means to charge one side of said capacitor to one polarity during those half cycles of the alternating voltage of said one polarity and to charge the other side of said capacitor to the opposite polarity during those half cycles of the alternating voltage of said opposite polarity whereby said rectifier means is charged to a unidirectional voltage, and circuit means for interconnecting said capacitor means and said fusible means to effect blowing thereof.

5. The invention, as set forth in claim 4, wherein an electrode is positioned in insulated spaced relation to said fusible means and an arc is drawn therebetween on connection to said capacitor means to blow said fusible means.

6. The invention, as set forth in claim 4, wherein said circuit means connects said capacitor means in shunt circuit relation to said fusible means to blow the same.

7. The invention, as set forth in claim 4, wherein normally open switch means are arranged to be closed by a live line tool to connect said capacitor means to said fusible means.

8. In an electric power system, the combination with a conductor energized at a relatively high alternating voltage, a dropout fuse device connected in series with said conductor, and operating means for effecting the dropout action of said fuse device; of means for initiating the functioning of said operating means including: capacitor means, rectifier means, conductive circuit means directly interrconnecting said capacitor means and said conductor through said rectifier means to charge one side of said capacitor to one polarity during those half cycles of the alternating voltage of said one polarity and to charge the other side of said capacitor to the opposite polarity during those half cycles of the alternating voltage of said opposite polarity whereby said capacitor means is charged to a unidirectional voltage, and circuit means for interconnecting said capacitor means and said operating means.

9. The invention, as set forth in claim 8, wherein said operating means includes a latch and electro-responsive means for unlatching said latch to permit said fuse device to dropout, and said circuit means connects said capacitor means to said electro-responsive means.

10. The invention, as set forth in claim 9, wherein normally open switch means are arranged to be closed by ranged and adapted to send radio signal to said radio receiver to close said contacts.

11. The invention, as set forth in claim 1, wherein the last named circuit means includes a radio receiver and normally open contacts operated thereby and when closed completing a discharge circuit from said capacitor means to said operating means, and a radio transmitter is arranged and adapted to send radio signal to said radio receiver to close said contacts.

12. The invention, as set forth in claim 11, wherein said radio receiver is energized by current flow in said line conductor.

13. The invention, as set forth in claim 11, wherein said radio receiver is energized by current flow through said rectifier means.

14. The invention, as set forth in claim 1, wherein the last named circuit means includes normally open switch means arranged to be closed by a live line tool to connect said capacitor means to said operating means.

15. In an electric power system, the combination with a line conductor energized at relatively high alternating voltage connected by a reclosable circuit breaker to a load conductor, and trip means and reclosing means for said circuit breaker; of means for initiating the functioning of said trip means and said reclosing means including: capacitor means, rectifier means, conductive circuit means directly interconnecting said capacitor means and said line conductor through said rectifier means to charge one side of said capacitor to one polarity during those half cycles of the alternating voltage of said one polarity and to charge the other side of said capacitor to the opposite polarity during those half cycles of the alternating voltage of said opposite polarity whereby said capacitor means is charged to a unidirectional voltage and is maintained charged at said voltage as long as said line conductor is energized at said relatively high voltage, and circuit means for selectively interconnecting said capacitor means with said trip means and said reclosing means for respectively opening said circuit breaker and reclosing the same.

16. The invention, as set forth in claim 15, wherein the last named circuit means includes normally open switch means arranged to be closed by a live line tool to connect said capacitor means either to said trip means or said reclosing means as the case may be.

17. The invention, as set forth in claim 15, wherein the last named circuit means includes a radio receiver and normally open contacts operated thereby and when closed completing a discharge circuit from said capacitor means either to said trip means or to said reclosing means as the case may be, and a radio transmitter is arranged and adapted to send a radio signal to said radio receiver to close said contacts.

18. The invention, as set forth in claim 17, wherein said radio receiver is energized by current flow through said rectifier means.

19. In an electric power system, the combination with a line conductor energized at relatively high alternating voltage connected by a reclosable circuit breaker to a load conductor, and trip means and reclosing means for said circuit breaker; of means for initiating the functioning of said trip means and said reclosing means including: capacitor means, a pair of rectifiers commonly connected in series circuit relation to conduct direct current in the same direction and in shunt circuit relation to said capacitor means, conductive circuit means directly interconnecting the common connection between said rectifiers and said line conductor to charge one side of said capacitor to one polarity during those half cycles of the alternating voltage of said one polarity and to charge the other side of said capacitor to the opposite polarity during those half cycles of the alternating voltage of said opposite polarity whereby said capacitor means is charged to a unidirectional voltage and is maintained charged at said voltage as long as said line conductor is energized at said relatively high voltage, and circuit means for selectively interconnecting said capacitor means with said trip means and said reclosing means for respectively opening said circuit breaker and reclosing the same.

20. In a polyphase electric power system, the combination with a line conductor for each phase energized at a relatively high alternating voltage connected by circuit interrupter means to a load conductor, and operating means for each said circuit interrupter means to disconnect the respective load conductor from its line conductor; of means individual to each phase for initiating the functioning of the respective operating means including: capacitor means, rectifier means, conductive circuit means directly interconnecting said capacitor means and one of said conductors of the respective phase through said rectifier means to charge one side of said capacitor to one polarity during those half cycles of the alternating voltage of said one polarity and to charge the other side of said capacitor to the opposite polarity during those half cycles of the alternating voltage of said opposite polarity whereby said capacitor means is charged to a unidirectional voltage, and circuit means for interconnecting said capacitor means and the respective operating means.

21. The invention, as set forth in claim 20, wherein means are provided for simultaneously effecting the operation of said operating means of the several phases.

22. The invention, as set forth in claim 21, wherein said means includes a radio receiver individual to each phase and normally open contacts operated thereby and when closed completing a discharge circuit from the respective capacitor means to the respective operating means, and a radio transmitter is arranged and adapted to send a radio signal to each radio receiver to close said contacts associated therewith.

23. In an energy storing system, the combination with a conductor energized with alternating current and energy utilizing means; of means for deriving electrical energy from said conductor and storing the same including: capacitor means, rectifier means, conductive circuit means directly interconnecting said capacitor means and said conductor through said rectifier means to charge one side of said capacitor to one polarity during those half cycles of the alternating voltage of said one polarity and to charge the other side of said capacitor to the opposite polarity during those half cycles of the alternating voltage of said opposite polarity whereby said capacitor means is charged to a unidirectional voltage, and circuit means for interconnecting said capacitor means and said energy utilizing means.

24. The invention, as set forth in claim 23, wherein means connected across said capacitor means limit the voltage to which the same can be charged.

25. In an energy storing system, the combination with one conductor energized at a relatively high voltage with respect to ground or another conductor and energy utilizing means; of means for deriving electrical energy from said conductor and storing the same including: capacitor means, rectifier means, conductive circuit means directly interconnecting said capacitor means and said conductor through said rectifier means to charge one side of said capacitor to one polarity during those half cycles of the alternating voltage of said one polarity and to charge the other side of said capacitor to the opposite polarity during those half cycles of the alternating voltage of said opposite polarity whereby said capacitor means is charged to a unidirectional voltage, voltage limiting means connected across said capacitor means including series connected impedance means and a device arranged and adapted normally to be nonconducting and to become conducting on application thereto of a predetermined voltage, and circuit means for interconnecting said capacitor means and said energy utilizing means.

26. In an energy storing system, the combination with one conductor energized at a relatively high voltage with respect to ground or another conductor and energy utilizing means; of means deriving electrical energy from said conductor and storing the same including: capacitor means, a pair of rectifiers commonly connected in series to conduct direct current in the same direction and in shunt circuit relation with said capacitor means, conductive circuit means directly interconnecting the common connection between said rectifiers and said one conductor to charge one side of said capacitor to one polarity during those half cycles of the alternating voltage of said one polarity and to charge the other side of said capacitor to the opposite polarity during those half cycles of the alternating voltage of said opposite polarity whereby said capacitor means is charged to a unidirectional voltage; said rectifiers, capacitor means and circuit connections thereto being maintained substantially at the alternating voltage of said one conductor and insulated from ground and from said other conductor; and circuit means for interconnecting said capacitor means and said energy utilizing means.

27. The invention, as set forth in claim 26, wherein capacitor plate means are connected to said capacitor means for increasing the rate at which the latter is charged from said one conductor.

28. In an energy storing system, the combination with one conductor energized at a relatively high voltage with respect to ground or another conductor and energy utilizing means; of means deriving electrical energy from said conductor and storing the same including: capacitor means, a pair of rectifiers commonly connected in series to conduct direct current in the same direction and in shunt circuit relation with said capacitor means, conductive circuit means directly interconnecting the common connection between said rectifiers and said one conductor to charge one side of said capacitor to one polarity during those half cycles of the alternating voltage of said one polarity and to charge the other side of said capacitor to the opposite polarity during those half cycles of the alternating voltage of said opposite polarity whereby said capacitor means is charged to a unidirectional voltage, voltage limiting means connected in shunt circuit relation with said capacitor means; said rectifiers, capacitor means, voltage limiting means and circuit connections thereto being maintained substantially at the alternating voltage of said one conductor and insulated from ground and from said other conductor; and circuit means for interconnecting said capacitor means and said energy utilizing means.

29. In an energy storing system the combination with one conductor energized at a relatively high voltage with respect to ground or another conductor and energy utilizing means; of means deriving electrical energy from said conductor and storing the same including: capacitor means, a pair of rectifiers commonly connected in series to conduct direct current in the same direction and in shunt circuit relation with said capacitor means, conductive circuit means directly interconnecting the common connection between said rectifiers and said one conductor to charge one side of said capacitor to one polarity during those half cycles of the alternating voltage of said one polarity and to charge the other side of said capacitor to the opposite polarity during those half cycles of the alternating voltage of said opposite polarity whereby said capacitor means is charged to a unidirectional voltage, voltage limiting means connected in shunt circuit relation with said capacitor means, said voltage limiting means including series connected impedance means and a device arranged and adapted normally to be non-conducting and to become conducting on application thereto of a predetermined unidirectional voltage; said rectifiers, capacitor means, voltage limiting means and circuit connections thereto being maintained substantially at the alternating voltage of said one conductor and insulated from ground and from said other conductor; and circuit means for interconnecting said capacitor means and said energy utilizing means.

30. The invention, as set forth in claim 29, wherein circuit connections to said voltage limiting means connect to other energy utilizing means.

31. In an electric power system, the combination with a line conductor energized at a relatively high alternating voltage connected by circuit interrupter means to a load conductor, and operating means for said circuit interrupter means to disconnect said load conductor from said line conductor; of means for initiating the functioning of said operating means including: capacitor means, rectifier means, conductive circuit means directly interconnecting said capacitor means and one of said conductors through said rectifier means to charge one side of said capacitor to one polarity during those half cycles of the alternating voltage of said one polarity and to charge the other side of said capacitor to the opposite polarity during those half cycles of the alternating voltage of said opposite polarity whereby said capacitor means is charged to a unidirectional voltage, chargeable battery means connected across said capacitor means, and circuit means connecting said capacitor means and said battery means with said operating means.

32. In an electric power system, the combination with a line conductor energized at a relatively high alternating voltage connected by circuit interrupter means to a load conductor, and operating means for said circuit interrupter means to disconnect said load conductor from said line conductor; of means for initiating the functioning of said operating means including: energy storage means substantially at the voltage of one of said conductors, means for connecting said energy storage means to said operating means including radio receiver means normally open contact means operated thereby and when closed completing a circuit from said energy storage means to said operating means, and radio transmitter means arranged and adapted to send a radio signal to said radio receiver means to close said contact means.

33. In a polyphase electric power system, the combination with a line conductor for each phase energized at a relatively high alternating voltage connected by circuit interrupter means to a load conductor, and operating means for each said circuit interrupter means to disconnect the respective load conductor from its line conductor; of means individual to each phase for initiating the functioning of the respective operating means including: energy storage means individual to and substantially at the voltage of each phase conductor, means for connecting each energy storage means to the respective operating means including radio receiver means and normally open contact means operated thereby and when closed completing a circuit from the respective energy storage means to its operating means, and radio transmitter means arranged and adapted to send a radio signal simultaneously to each of said radio receiver means to close said contact means and effect the functioning of each operating means.

34. In an energy storing system, the combination with a conductor energized with alternating current and energy utilizing means; of means for deriving electrical energy from said conductor and storing the same including: capacitor means, rectifier means, conductive circuit means directly interconnecting said capacitor means and said conductor through said rectifier means to charge one side of said capacitor to one polarity during those half cycles of the alternating voltage of said one polarity and to charge the other side of said capacitor to the opposite polarity during those half cycles of the alternating voltage of said opposite polarity whereby said capacitor means is charged to a unidirectional voltage, chargeable battery means connected to be charged from said capacitor means, and circuit means connecting said battery means with said energy utilizing means.

35. The invention, as set forth in claim 34, wherein a device arranged and adapted normally to be nonconducting and to become conducting on application thereto of a predetermined voltage is interposed between said capacitor means and said chargeable battery.

36. In an energy storing system, the combination with a conductor energized with alternating current and energy utilizing means; of means for deriving electrical energy from said conductor and storing the same including: capacitor means, rectifier means, conductive circuit means directly interconnecting said capacitor means and said conductor through said rectifier means to charge one side of said capacitor to one polarity during those half cycles of the alternating voltage of said one polarity and to charge the other side of said capacitor to the opposite polarity during those half cycles of the alternating voltage of said opposite polarity whereby said capacitor means is charged to a unidirectional voltage, a transformer having primary and secondary windings, a voltage limiting device, circuit means connecting said primary winding and said voltage limiting device in series and in shunt with said capacitor, a rectifier, a chargeable battery, circuit means connecting said secondary winding and said rectifier in series and in shunt with said battery whereby it is charged, and circuit means connecting said battery with said energy utilizing means.

37. The invention, as set forth in claim 36, wherein a capacitor is connected to be charged with said battery and to be discharged through said energy utilizing means.

38. In an electric power system, in combination, a line conductor energized at a relatively high alternating voltage and a load conductor, circuit interrupter means interconnecting said conductors including series connected separable contact circuit interrupters and disconnecting switch means therebetween, operating means for each circuit interrupter to disconnect said disconnecting switch means from said conductors, and means for initiating the functioning of each operating means including: capacitor means, rectifier means, conductive circuit means directly interconnecting said capacitor means and the respective conductor to charge one side of said capacitor to one polarity during those half cycles of the alternating voltage of said one polarity and to charge the other side of said capacitor to the opposite polarity during those half cycles of the alternating voltage of said opposite polarity whereby said capacitor means is charged to a unidirectional voltage, and circuit means connecting said capacitor means with the respective operating means.

39. The invention, as set forth in claim 38, wherein means are provided for effecting simultaneous operation of said circuit interrupters.

40. The invention, as set forth in claim 39, wherein the means for effecting simultaneous operation of said circuit interrupters includes a radio receiver individual to each circuit interrupter, and a radio transmitter common to said radio receivers.

41. The invention, as set forth in claim 39, wherein the means for effecting simultaneous operation of said circuit interrupters includes contact means individual to each operating means, and means for controlling simultaneously the operation of each contact means.

42. The invention, as set forth in claim 38, wherein means are provided to prevent opening of said circuit interrupters as long as the current flow in said line conductor exceeds a predetermined current flow.

43. In an electric power system, the combination with a conductor energized at a relatively high alternating voltage, circuit interrupter means connected in series with said conductor, and trip means therefor; of means for initiating the operation of said trip means including: capacitor means, rectifier means, conductive circuit means directly interconnecting said capacitor means and said conductor through said rectifier means to charge one side of said capacitor to one polarity during those half cycles of the alternating voltage of said one polarity and to charge the other side of said capacitor to the opposite polarity during those half cycles of the alternating voltage of said opposite polarity whereby said capacitor means is charged to a unidirectional voltage, circuit means for interconnecting said capacitor means and said trip means, and means for preventing energization of said trip means from said capacitor means as long as the current flow in said conductor exceeds a predetermined current flow.

44. In a polyphase electric power system, the combination with a line conductor for each phase energized at a relatively high alternating voltage connected by circuit interrupter means to a load conductor, and operating means for each said circuit interrupter means to connect and disconnect the respective load conductor from its line conductor, the operating means for each phase being independent of the operating means for the other phases; of means individual to each phase for initiating the functioning of the respective operating means including: radio receiver means and control means operated thereby, said control means being arranged and adapted to effect operation of the operating means for the respective phase, and radio transmitter means arranged and adapted to send a radio signal to each of said radio receiver means to operate the control means individual thereto and effect the functioning of each operating means to close or open simultaneously the circuit interrupter means for each phase.

References Cited

UNITED STATES PATENTS

| | | | |
|---|---|---|---|
| 3,167,686 | 1/1965 | Riebs | 317—22 |
| 3,178,615 | 4/1965 | Miller et al. | 317—22 |
| 3,209,207 | 9/1965 | La Sota et al. | 317—151 |
| 3,256,447 | 6/1966 | Stumpe et al. | |

FOREIGN PATENTS

| | | |
|---|---|---|
| 1,091,198 | 10/1960 | Germany. |
| 1,146,950 | 4/1963 | Germany. |

MILTON O. HIRSHFIELD, *Primary Examiner.*

R. V. LUPO, *Assistant Examiner.*

UNITED STATES PATENT OFFICE

CERTIFICATE OF CORRECTION

Patent No. 3,348,099                      October 17, 1967

Edmund O. Schweitzer, Jr., et al.

It is hereby certified that error appears in the above numbered patent requiring correction and that the said Letters Patent should read as corrected below.

Column 10, lines 13 and 14, for "ranged and adapted to send radio signal to said radio receiver to close said contact." read -- a live line tool to connect said capacitor means to said electro-responsive means. --; column 13, line 15, for "nect to other energy utilizing means." read -- nect the same to other energy utilizing means. --.

Signed and sealed this 29th day of October 1968.

(SEAL)

Attest:

Edward M. Fletcher, Jr.

Attesting Officer

EDWARD J. BRENNER

Commissioner of Patents